United States Patent

Maezawa

[11] 3,915,554
[45] Oct. 28, 1975

[54] LIQUID CRYSTAL DISPLAY DEVICE WITH CONTROLLABLE COLOR

[75] Inventor: Shuji Maezawa, Suwa, Japan

[73] Assignee: Kabushiki Kaisha Suwa Seikosha, Tokyo, Japan

[22] Filed: Feb. 13, 1974

[21] Appl. No.: 442,279

[30] Foreign Application Priority Data
Feb. 13, 1973 Japan.................................. 48-17074

[52] U.S. Cl............................ 350/160 LC; 350/150
[51] Int. Cl.² ............................................. G02F 1/13
[58] Field of Search...................... 350/160 LC, 150

[56] References Cited
UNITED STATES PATENTS

| | | | |
|---|---|---|---|
| 3,731,986 | 5/1973 | Fergason | 350/160 LC X |
| 3,785,721 | 1/1974 | Harsch | 350/160 LC X |
| 3,832,033 | 8/1974 | Furuhata et al. | 350/160 LC |

*Primary Examiner*—Edward S. Bauer
*Assistant Examiner*—Matthew W. Koren
*Attorney, Agent, or Firm*—Blum Moscovitz Friedman & Kaplan

[57] ABSTRACT

In a liquid crystal display device the liquid crystal material is of positive dielectric anisotropy and the walls of the cell are unidirectionally rubbed. By orienting the cell walls so that the rubbing directions lie at a suitable angle to each other and by varying the voltage applied to transparent electrodes on the inner faces of said cell walls, it becomes possible to control the hue of the light transmitted by said cell, and thereby the color of the resultant display.

13 Claims, 3 Drawing Figures

LIQUID CRYSTAL DISPLAY DEVICE WITH CONTROLLABLE COLOR

BACKGROUND OF THE INVENTION

It is known that rotation of the plane of linearly-polarized light can be produced by the use of liquid crystal material of positive dielectric anisotropy in a liquid crystal display cell where the opposed plates of the cell have each been unidirectionally rubbed and the plates are so oriented with respect to each other than the rubbing angle, i.e., the angle between the directions of rubbing on the two plates is other than 0. Conventionally the rubbing angle is set at 90°, and the cell is used in combination with a polarizer and an analyzer where the polarizer and analyzer are set either with their axes parallel to each other or crossed at an angle of 90°. Under such circumstances, the display presented by the cell when the electrodes on the inner faces of the walls are activated by the application of suitable voltage thereto is of the same color as the incident light, normally white light. Furthermore, depending on whether the polarizer and analyzer axes are parallel or at 90° to each other, the display will be in the form of bright indicia against a dark background or vice versa.

Displays of this type are useful for timepieces, and, in particular, wristwatches, computers, etc. Also, work is proceeding on the possibility of using such devices for the eventual production of flat-screen television. However, as aforenoted, the display produced depends upon the color of the incident light, so that, essentially, if flat-screen television results from conventional liquid crystal display devices, said television will be in black and white. Naturally, it would be highly desirable that said flat-screen television be in color. In the shorter term, it would be desirable that it be possible to vary or select the color of liquid crystal displays whether in timepieces, computers, etc. as aforenoted.

Conventional electro-optical display devices using nematic liquid crystals operate in a variety of ways. For instance, there is the dynamic scattering mode (DMS), the DAP-effect type of crystal, and the twisted nematic mode, the last being the mode discussed above. Where the dynamic scattering mode is used, the ability to change or modulate the hue has not been possible. The DAP-effect type of material is difficult to produce. Also, as aforenoted, the twisted nematic mode which results from a rubbing angle of 90° and a pair of polarizing elements at right angles or parallel to each other again have failed to yield any possibility of producing color. The failure of these systems, as will become apparent, is due to the fact that the birefringence of liquid crystal molecules has not been utilized.

SUMMARY OF THE INVENTION

A liquid crystal display device includes, in sequence, a polarizer, a cell containing liquid crystal material and an analyzer. The inner walls of the cell have transparent conductive electrodes thereon, said electrodes being connectible to an external source of variable voltage. In a preferred arrangement, the axes of the polarizer and analyzer are crossed at 90°. For a cell having a thickness of 6µ the threshold voltage is about 3 volts and the maximum voltage needed for control of the hue of the transmitted light is about 7.6 volts. Where a light source is used, it is preferable to use lens means to render the light falling on the polarizer-cell-analyzer assembly normal to the elements of the system. The voltage applied may be AC and a preferred frequency is 32Hz.

Accordingly, an object of the present invention is an electro-optical display device wherein the color of said display can be controlled.

A further object of the present invention is an electro-optical display device wherein both the color and intensity of the display can be controlled.

An important object of the present invention is an electro-optical display device wherein the birefringence of a nematic liquid crystal material having positive dielectric anisotropy is used for control of color of a display.

A significant object of the present invention is an electro-optical display device wherein the color of the display presented depends upon the voltage applied to a liquid crystal cell which is part of said display.

Yet another object of the present invention is a method of controlling the color of an electro-optical display device based upon a liquid crystal cell.

Still another object of the present invention is a method of controlling the color and intensity of a display by the use of a liquid crystal cell having unidirectionally rubbed walls wherein the angle between the directions of rubbing on the two walls lies within certain preferred ranges.

Still other objects and advantages of the invention will in part be obvious and will in part be apparent from the specification.

The invention accordingly comprises the several steps and the relation of one or more of such steps with respect to each of the others, and the apparatus embodying features of construction, combination of elements and arrangements of parts which are adapted to effect such steps, all as exemplified in the following detailed disclosure, and the scope of the invention will be indicated in the claims.

BRIEF DESCRIPTION OF THE DRAWING

For a fuller understanding of the invention, reference is had to the following description taken in connection with the accompanying drawings, in which.

DESCRIPTION OF THE PREFERRED EMBODIMENT

Figure 1:
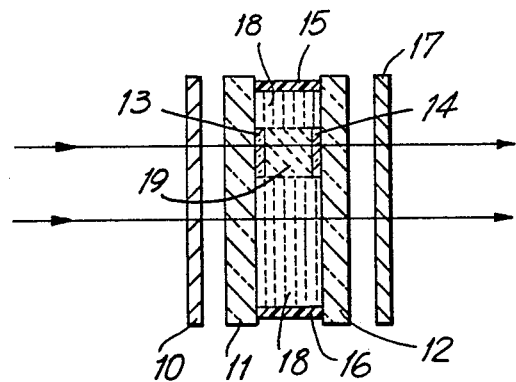
FIG. 1 is a sectional view of en electro-optical display device in accordance with the present invention.

In the embodiment of FIG. 1 a polarizer element 10 and an analyzer element 17 are at opposite faces of a liquid crystal cell formed of glass plates 11 and 12 and insulating spacers 15 and 16. Glass plates 11 and 12 are preferably of borosilicate glass and have formed on the surface thereof transparent electrodes 13 and 14. The cell contains liquid crystal material 18 which is a nematic liquid crystal composition of positive dielectric anisotropy.

In preparation for forming the liquid crystal cell, each of the inner surfaces of plates 11 and 12 are rubbed in a single direction, i.e., unidirectionally. The plates are assembled into a cell so that the rubbing angle, that is, the angle between the two directions in which the plates 11 and 12 are rubbed lie either between 30° and 60° or 120° and 150°.

In general, in a liquid crystal composition where the optical axes are aligned, the material exhibits birefringence similar to that shown by a uniaxial crystal so that an incident light beam is separated into an ordinary light beam and an extraordinary light beam. The basis for this phenomenon lies in the fact that the index of refraction for a uniaxial crystal varies with direction. Since the ordinary light beam and the extraordinary light beam travel at different speeds, a phase difference results.

In a liquid crystal cell in accordance with the present invention, the direction of orientation of the crystals at the inner surface and the polarizing direction are at right angles to each other. In other words, in the absence of an electric field, only the ordinary beam is transmitted. Also, the plane of polarization of the incident light is rotated in accordance with the shift in the principal axis of the liquid crystal molecules. In other words, the beam is rotated in accordance with the twist of the liquid crystal layer 18. In conventional cells, the rubbing angle is 90°. Under such circumstances, there is no modulation of hue. However, the strength of the beam transmitted depends upon the relationship between the axis of analyzer element 17 and the plane of polarization of the light emerging from glass plate 12.

When an electric field of sufficient strength is applied to liquid crystal layer 18 in the region 19 as shown in FIG. 1, through use of transparent electrodes 13 and 14, liquid crystals of the type specified re-orient themselves, and, accordingly, their dipole moments, in accordance with the strength of the electric field imposed across the cell. Molecules which previously were parallel to the electrode surfaces rotate toward the normal to the plates. As a result, the direction of polarization of the light passing therethrough is no longer at right-angles to the optical axis of the system and the beam is separated into an ordinary beam and an extraordinary beam. The degree of optical activity of the cell is then a function of the strength of the electric field imposed. The light reaching analyzer element 17 becomes elliptically polarized, and the light intensity emerging from analyzer element 17 varies with wavelength. The reason for the dependency on wavelength is that the phase shift is a function of wavelength. Consequently, both the hue and the intensity of the light traversing the system are modulated.

Figure 3:
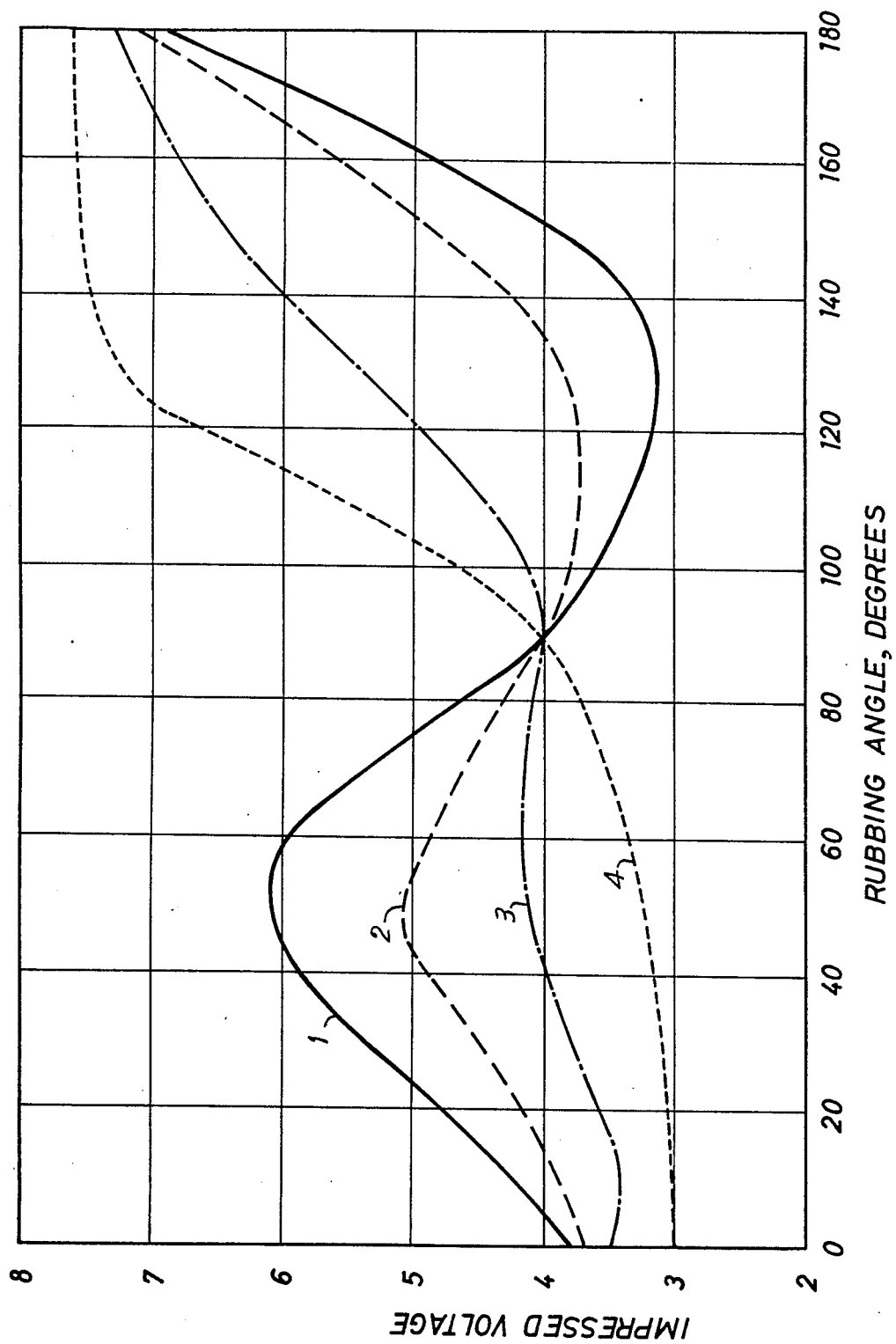
FIG. 3 is a graph showing the relationships among rubbing angle, impressed voltage and the hue of the display.

Modulation of the hue and the intensity of the light passing through the system depends on the strength of the electric field, the frequency of the electric field, the thickness of the liquid crystal layer 18, the rubbing angle between the unidirectionally rubbed plates, and the physical nature of the liquid crystal material. FIG. 3 shows how the hue depends upon the rubbing angle. As aforenoted, the rubbing angle is the angle between the rubbing directions of the opposed glass plates making up the liquid crystal cell. The rubbing itself is carried out with cotton wool or a similar material. Line 1 of FIG. 3 shows the voltage necessary as a function of rubbing angle to produce a red color when the axes of the polarizer and analyzer plates are crossed at 90°. Line 2 gives the voltages for green, line 3 for blue and line 4 for violet. As is evident from FIG. 3, the separation of the colors has one maximum between about 30° and 60° and a second maximum between about 120° and 150°. Consequently, these are the preferred orientations of the two plates relative to each other.

In general, the range of voltage necessary for control of the color transmitted is from about 3.0 to about 8.0 volts. More specifically, when the angle between the rubbing directions on the inner surfaces of the liquid crystal cell walls is between 30° and 60°, the range of voltage needed is about 3.3 to 6.1 and for an angle between 130° and 160° the range is 3.1 to 7.5.

The order of the curves is inverted, namely 1 corresponds to violet, 2 to blue, 3 to green and 4 to red when the axes of the polarizer and analyzer plates are parallel. However, when the polarizer and analyzer axes are at angles other than right-angles to each other, it becomes difficult to distinguish the colors. Consequently, the preferred angle between the polarizer and analyzer axes is 90°.

It should be noted that in the conventional twisted nematic liquid crystal device where the rubbing angle is 90°, a certain degree of hue modulation is generated between the threshold value and the saturation value of the impressed voltage, but since it occurs together with transition from light to dark or vice versa, the slight change in color is difficult to recognize.

Figure 2:
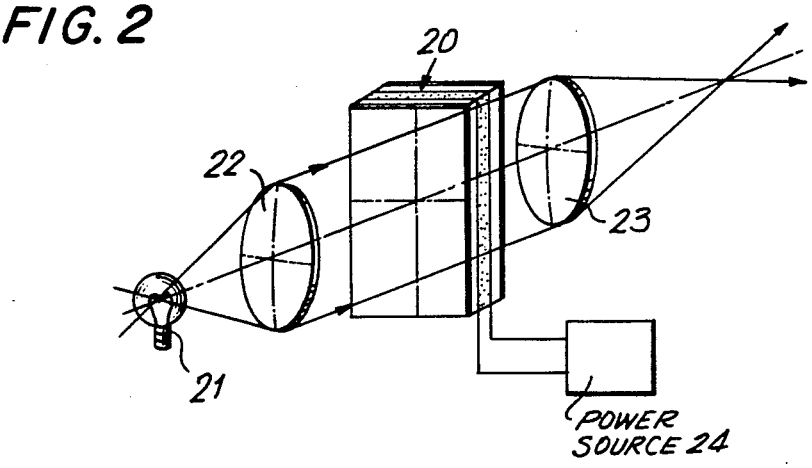
FIG. 2 is a perspective view of an embodiment of the present invention wherein parallel light is passed through a liquid crystal cell.

In general, it is preferable that the light incident upon the polarizer be perpendicular to the principal plane of the polarizer and to the remaining components of the system as well. Where necessary, steps can be taken to insure that the light falls upon the polarizer element essentially perpendicularly to the principal plane of the element. Thus, in FIG. 2, the light from light source 21 is converted into a parallel beam by lens 22 so that it reaches the assembly of polarizer, liquid crystal cell and analyzer 20 at essentially normal incidence. If desired, the light emerging from display device 20 can be focussed by lens 23. With respect to reproduction of an image, as in television, light source 21 can be viewed as corresponding to a point in an image to be reproduced. The combination of lenses 22 and 23 therefore serves to bring to a focus at a specific point that portion of the image located at the point corresponding to light source 21. Where a scanning system is used, the voltage impressed across the electrodes in the liquid crystal cell is controlled by power source 24 so that the color at the focal point of lens 23 will correspond to the color of the point being imaged.

As aforenoted, the voltage range necessary for producing the desired range of colors as given in FIG. 3, corresponds to a cell having a thickness of 6μ where the frequency supplied by the power supply 24 is 32Hz. Although the optimum voltage range will vary with the particular type of liquid crystal used and the thickness of the cell, the parameters can readily be determined by one skilled in the art. This follows from the fact that the optimum values of the rubbing angle have been determined.

The liquid crystal composition used in the cell of the present invention should be in the liquid crystal state over a range including room temperature. Such materials are well-known to those skilled in the art.

As is evident, the device can be used with ambient light. Consequently, the device can be used in combination with a reflective plate so that it can be small. In this particular feature, the device differs from the DAP-effect type wherein reflection cannot be utilized.

The particular fields of utilization appear to be in timepieces, calculators, instruments where a multiplicity of instruments are to be differentiated from each other and in flat color television.

It will thus be seen that the objects set forth above, among those made apparent from the preceding description, are efficiently attained and, since certain changes may be made in carrying out the above method and in the construction set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. An electro-optical color display device comprising, a liquid crystal cell having a pair of opposed walls, a nematic liquid crystal composition having a positive dielectric anisotropy in said cell, the inner faces of the walls of said cell having been unidirectionally rubbed and being positioned with the rubbing directions at an angle of 30° – 60° or 120° – 150° to each other and having transparent conductive elements on same connectible to an external source of variable voltage, and a polarizer and an analyzer sandwiching said cell, the polarization axis of said polarizer being at 90° to the rubbing direction of the nearer wall of said cell and 90° to the polarization axis of said analyzer whereby a voltage applied by said source to said elements having a value less than that required to produce a substantially homeotropic alignment in said liquid crystal composition results in the transmission of colored light through said analyzer for white light incident on said polarizer, said transmitted color being a function of the value of said voltage.

2. The electro-optical display device as defined in claim 1, further comprising a light source with lens means disposed for directing light from said source at near-normal incidence toward said polarizer.

3. The electro-optical display device as defined in claim 2 further comprising another lens means disposed for focussing light emerging from said analyzer.

4. The electro-optical display device as defined in claim 1, wherein said liquid crystal composition is in the liquid crystal state over a range including room temperature.

5. The electro-optical display device as defined in claim 1, wherein the walls of said cell are of borosilicate glass.

6. A method for controlling the color of a nematic liquid crystal display device wherein light is passed through a liquid crystal cell having a pair of opposed walls, a nematic liquid crystal composition having a positive dielectric anisotropy in said cell, the inner faces of the walls of said cell having been unidirectionally rubbed and being positioned with the rubbing directions at an angle of 30° – 60° or 120° – 150° to each other, and said inner faces having transparent conductive elements on same connectible to an external voltage source, and a polarizer and an analyzer sandwiching said cell, the polarization axis of said polarizer being at 90° to the rubbing direction of the nearer wall of said cell and at 90° to the polarization axis of said analyzer, comprising the step of applying a control voltage to said transparent conductive elements whereby a voltage applied by said source to said elements having a value less than that required to produce a substantially homeotropic alignment in said liquid crystal composition results in the transmission of colored light through said analyzer for white light incident on said polarizer, said transmitted color being a function of the value of said voltage.

7. The method of claim 6, wherein said control voltage lies between about 3.0 and 8.0 volts.

8. The method of claim 6 wherein said voltage alternates.

9. The method of claim 6 wherein said voltage alternates at a rate of about 32Hz.

10. The method of claim 6, wherein light from a light source is directed by lens means at near-normal incidence at said polarizer.

11. The method of claim 10, wherein light emerging from said analyzer is focussed by another lens means.

12. The method of claim 6, wherein said voltage is varied between about 3.3 and 6.1 when the angle between the rubbed directions on said walls of said liquid crystal cell lies between 30° and 60°, and the voltage is varied between about 3.1 and 7.5 volts when said angle lies between about 130° and 160°.

13. The method of claim 6, wherein the distance between the walls of said cell is about 6 microns.

* * * * *